Figure 1:
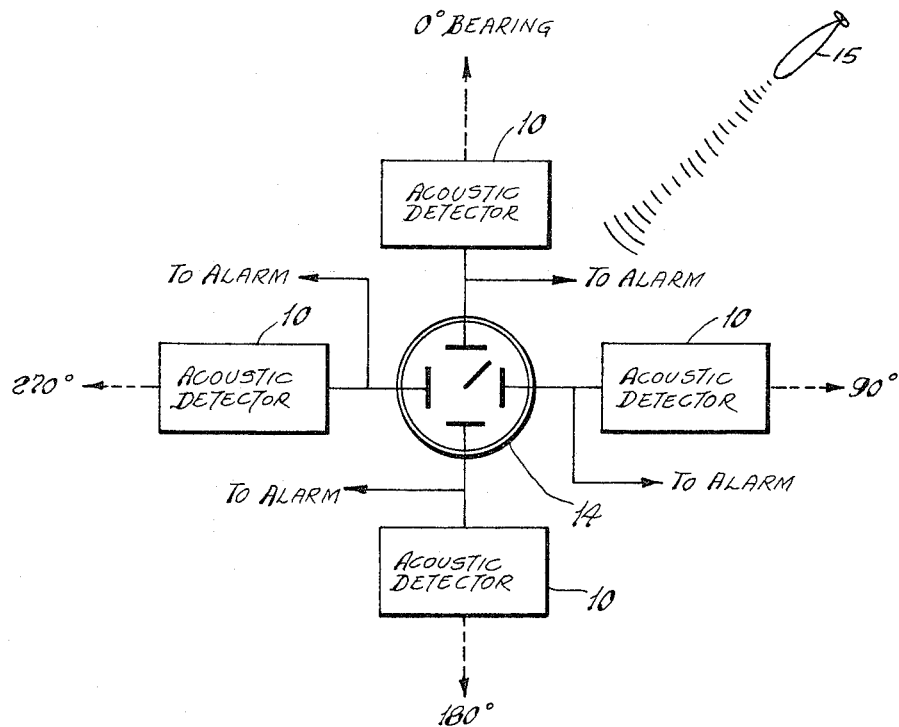

Oct. 4, 1966

E. J. PARSSINEN 3,277,451

WIDE ANGLE BROAD BAND HYDROPHONE ARRAY

Filed Nov. 21, 1963

4 Sheets-Sheet 1

INVENTOR.
EDWIN J. PARSSINEN
BY Arthur L. Bowers
AGENT
Max L. Garner
ATTORNEY

INVENTOR.
EDWIN J. PARSSINEN

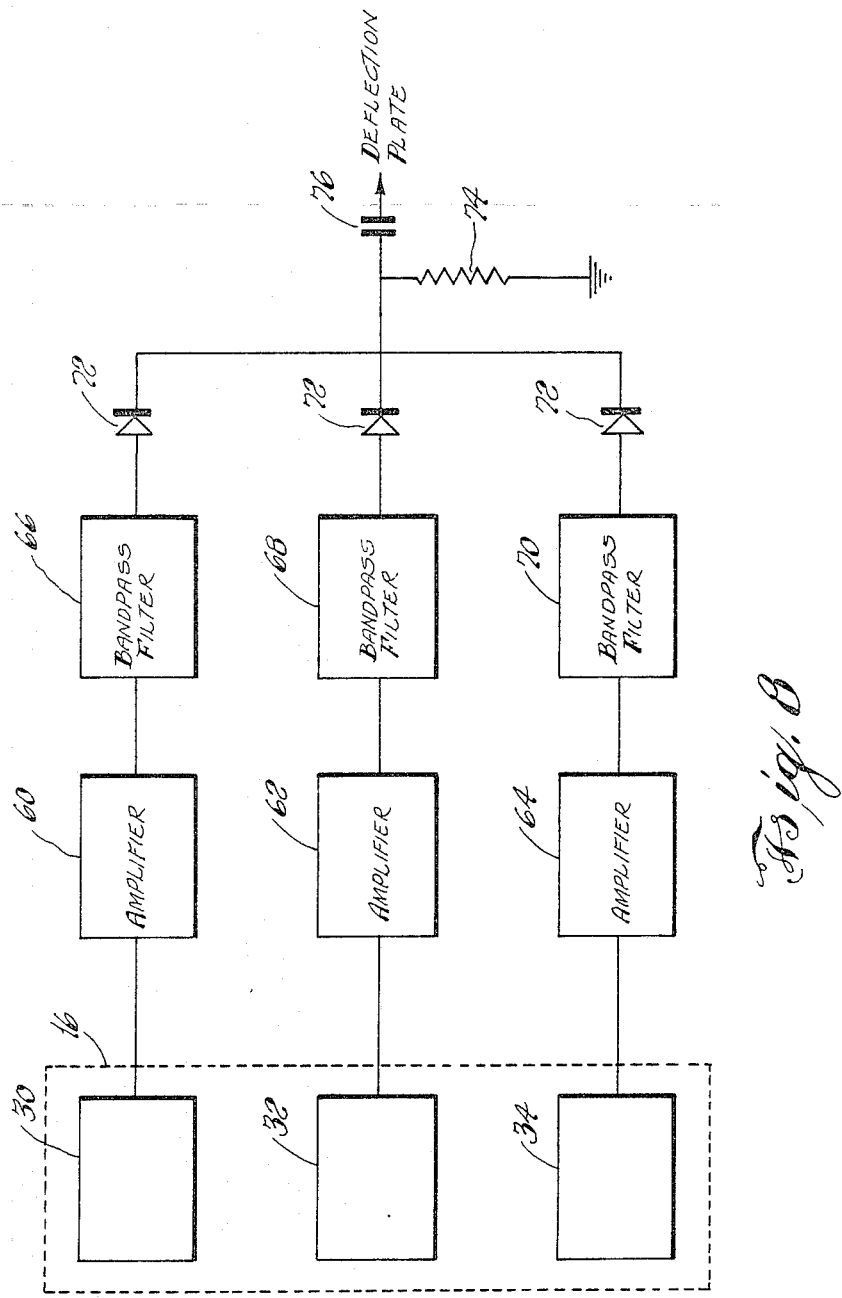

3,277,451
WIDE ANGLE BROAD BAND HYDROPHONE ARRAY
Edwin J. Parssinen, Mystic, Conn., assignor to the United States of America as represented by the Secretary of the Navy
Filed Nov. 21, 1963, Ser. No. 325,516
4 Claims. (Cl. 340—8)

The invention described herein may be manufactured and used by or for the Government of the United States of America for governmental purposes without the payment of any royalties thereon or therefor.

This invention relates to an underwater sound detector that has a wide-angle near-constant beam over a broad frequency spectrum and more particularly to a compact wide-open sonaramic system for a ship for detecting waterborne acoustic energy, especially pulsed acoustic energy exceeding predetermined intensity at the ship, within a predetermined frequency spectrum, originating at any bearing relative to the ship, and within a substantial elevation-depression angle, and for indicating the approximate bearing of the source of the acoustic energy.

One weapon available to attack surface and underwater vessels is the pinging torpedo which has an automatic target following system including equipment for emitting pulses of acoustic energy of a particular frequency forwardly of the torpedo and equipment for detecting reflections of the emitted pulsed energy from a target and for controlling the guidance mechanism of the torpedo to steer the torpedo toward the target. Given sufficient warning, the ship's commanding officer can initiate countermeasures and can change course and speed and thereby succesfully evade the torpedo. Ideally, the vessel should be outfitted to be continuously capable of detecting an attack by a pinging torpedo and to be capable of immediately indicating the bearing of the pinging torpedo regardless of the pinging frequency.

The frequency spectrum suitable for the torpedo pinging system is limited at the low end by size and weight of the system which is necessarily larger and heavier as operating frequency is reduced and is limited at the high end by range limitations due to increasing attenuation of acoustic energy with increasing frequency. This frequency spectrum has been very liberally estimated to extend from 10–120 kc./sec.

An object of this invention is to provide a compact, reliable, easy to operate sentinel system for a surface or underwater ship, continuously operative to detect a pinging torpedo in the ship's vicinity.

A further object of this invention is to provide a sentinel system continuously operative to detect a pinging torpedo and to indicate its approximate bearing.

A further object is to provide a sonaramic system that is continuously operable wide-open in bearing and wide-open over a broad frequency spectrum.

A further object is to provide a sonaramic system for detecting a pinging torpedo attack, that is continuously operable wide-open in bearing and wide-open over a broad frequency spectrum.

A further object is to provide means continuously operative to detect waterborne acoustic energy within a wide frequency spectrum and for indicating the bearing of the source of such energy.

A further object is to provide a detector of waterborne acoustic energy that has a more constant beamwidth over a frequency spectrum of several octaves than detectors heretofore available.

A further object is to provide a compact generally superior hydrophone for broad spectrum broad beam applications.

Other objects and advantages will appear from the following description of an example of the invention, and the novel features will be particularly pointed out in the appended claims.

Figure 2:
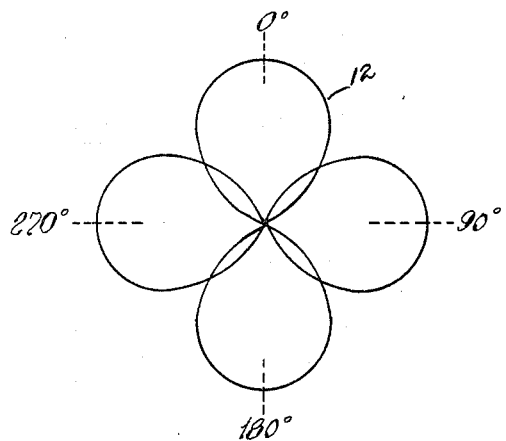
Figure 3:
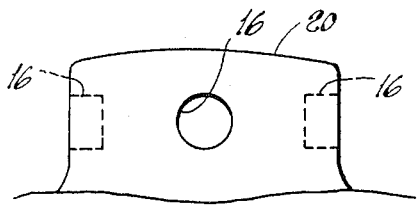
Figure 4:
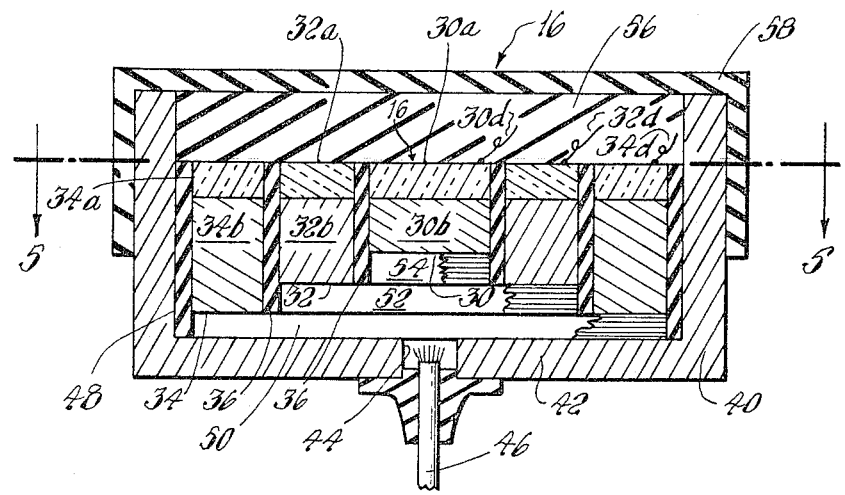
Figure 5:
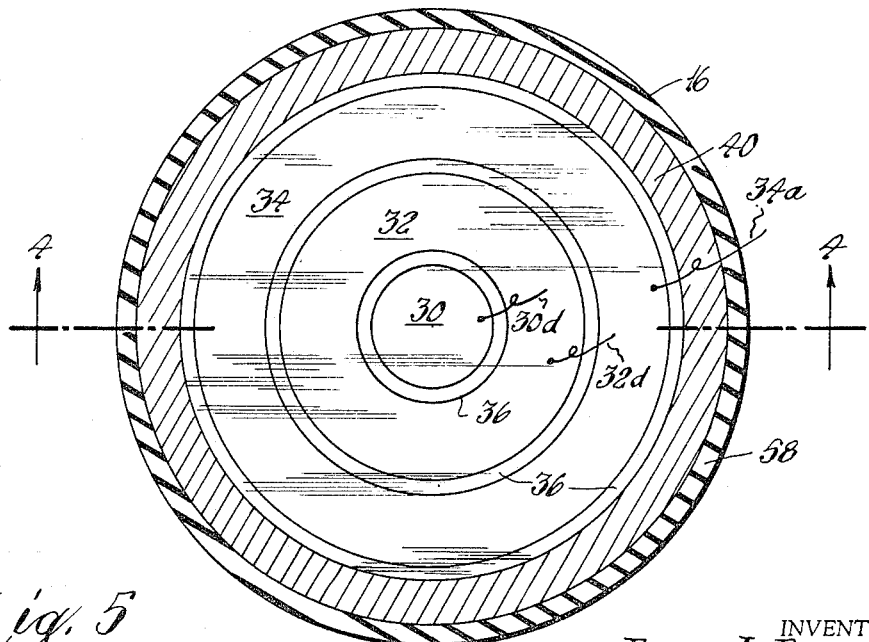
Figure 6:
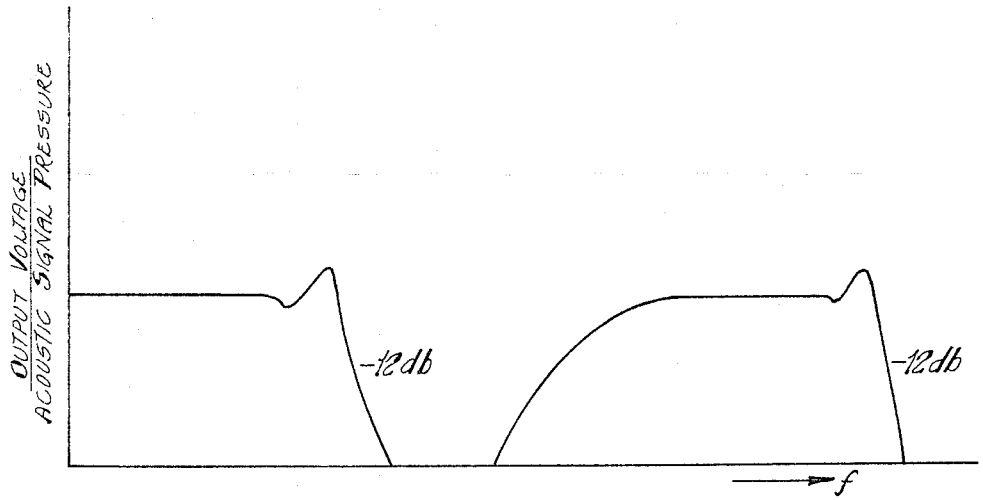
Figure 7:
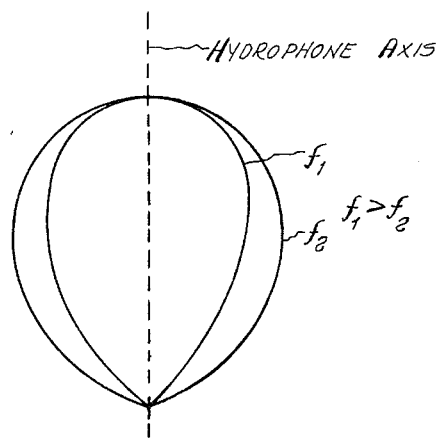

FIG. 1 is a simplified block diagram of a system in accordance with this invention including four identical acoustic detectors coupled to an oscilloscope, FIG. 2 shows beam pattrens of the detectors shown in FIG. 1, FIG. 3 illustrates a hydrophone mounting for this invention, FIGS. 4 and 5 are cross sections of a hydrophone array embodiment for the system shown in FIG. 1 taken on line 4—4 of FIG. 5 and line 5—5 of FIG. 4, respectively, FIG. 6 is a representative plot on rectangular coordinates of sensitivity vs. frequency of a piezoelectric detector, FIG. 7 illustrates two beam patterns of a piezoelectric hydrophone array at two spaced frequencies, and FIG. 8 is a block diagram of one acoustic detector as in FIG. 1.

The system shown in FIG. 1 includes four identical acoustic energy detectors 10, oriented 90 degrees apart in azimuth, each characterized by wide-angle beam patterns similar to representative beam patterns 12 shown in FIG. 2, over a broad frequency spectrum. The outputs of each of the acoustic detectors 10 are coupled to respective deflection plates of an electrostatic oscilloscope 14. The oscilloscope beam may be constant, or in the alternative, the beam may be normally biased off and the output of each detector coupled to the electron gun of the tube for reducing the bias to turn on or brighten the beam, as is well known in the art. Each of the detectors has a predetremined threshold to minimize low-level noise. If a signal arrives substantially axially of one detector, the detectors directed at 90 degrees with respect to the bearing of the signal source will not respond to the signal. When a signal is sensed by one detector only, the oscilloscope beam is deflected directly toward the respective oscilloscope plate. If a signal arrives from a source 15, that is at a bearing between the axes of two detectors, as in FIG. 1, the signal is detected by both those detectors and the oscilloscope beam is deflected in a direction between the two respective oscilloscope plates. The face of the oscilloscope has bearing calibration markings which are not shown on the drawing. The angle of deflection is the resultant of vector addition of the deflecting voltages applied to the two deflection plates. If the bearings of the signal source relative of two detectors are equal, i.e., 45 degrees relative to each, the deflection voltages are of equal amplitude and the beam is deflected at 45 degrees relative to the two deflection plates. If the bearings of the signal source relative to the two detectors are unequal, the detected signals are of unequal intensity and the beam is deflected accordingly whereby the bearing indicated on the oscilloscope is a close approximation of the bearing of the source. If the detected signal is a pulse train, as from a pinging torpedo, the signal appears on the oscilloscope as a line or a periodic linear sweep. If the signal source is approaching, the length of the linear display increases because the deflection voltages increase with the signal intensity. If the detected signal is not a pulse train the signal appears as a spot after the initial deflection, and changes position only insofar as the source position changes relative to the detectors, presuming constant signal strength at the source.

While a person may be assigned to observe the oscilloscope 14 at all times, it is advantageous and generally more practical to use an alarm device to attract attention to the oscilloscope when a signal is detected. For example, an eye catching means such as a strobe light circuit may be used as an alarm to be activated when there is a signal output from any of the acoustic detectors 10. A strobe light circuit will flash in response to each signal pulse and in effect operate as an alarm for pulse signals only.

Each of the acoustic detectors 10 includes a wide angle broadband hydrophone array 16; the four hydrophone arrays 16 are nested in a support 20 shown in FIG. 3 mounted atop the sail or bottom of the hull of a submarine or at the bottom of a surface ship's hull so as not to be in the shadow of other structure. The hydrophone arrays are oriented 90 degrees apart in azimuth. The support 20 is streamlined to minimize water noise and for submarine applications particularly, is free flooding to preclude structural design and water sealing problems.

Each of the acoustic detectors 10 includes a hydrophone array 16 shown in FIGS. 4 and 5. The hydrophone array includes three coaxial hydrophones 30, 32, 34, which are circular and of successively larger diameter with the smallest surrounded by the intermediate and the latter surrounded by the largest; the outer two hydrophones 32 and 34 are annular and the center hydrophone is a solid circular cylinder. The innermost hydrophone may also be annular. Each of the hydrophones 30, 32, and 34 have flat, smooth end faces normal to the axis of the hydrophone array. Each of the three hydrophones is a combination of two parts, one being of piezoelectric ceramic identified by the additional reference character $a$, and an inertial mass of a metal identified by the additional reference character $b$, and having the same diameter as the ceramic. Brass is satisfactory; a denser metal such as lead may be used. The two parts are bonded together end-to-end by an electrically nonconductive rigid adhesive; epoxy adhesives which harden rigid are satisfactory.

Each piezoelectric ceramic part is coated with a conducting film, not shown, on its opposite end faces and is polarized between the opposed conductive films, and separate conductor leads $30d$, $32d$, $34d$ are connected to the conducting films as is conventional. The particular piezoelectric ceramic material, the particular metal for the inertial mass, and the particular adhesive are not critical to the invention.

The radial spacing between the hydrophones 30, 32, 34 is occupied by a fairly soft, stable elastomeric material, e.g., approximately 40-durometer, but there is considerable latitude in the degree of softness. The elastomeric separators 36 may be sheet material; however, for ease of assembly elastomeric separators in the form of slit cylinders is preferable. The hydrophones 30, 32, 34 and the elastomeric spacers 36 are manually press-fitted together with the outer faces of the piezoelectric ceramic parts $30a$, $32a$, and $34a$, essentially coplanar; the elastomeric spacers serve to retain the hydrophones in assembled relationship and to vibrationally decouple the hydrophones. It is unnecessary to bond the separators to the hydrophones.

Each hydrophone array is nested in a protective housing 40 open on one side to expose the planar face of the hydrophone array to waterborne acoustic energy. The end wall 42 of the housing is formed with an opening 44 for a cable 46 having six conductor leads for connection to conductor pairs $30d$, $32d$ and $34d$ of the respective hydrophones. The cable 46 is sealed watertight in the opening 44. An elastomeric separator 48 similar to separators 36 is disposed between the periphery of the hydrophone array and the housing. Three pressure release elements 50, 52, and 54 having the same outside diameter as hydrophones 30, 32, 34 respectively, and having thicknesses to make up for the difference in lengths of hydrophones 30, 32, 34 are pyramided between the housing end wall 42 and the hydrophones. If the acoustic detector is to be used over a wide range of static pressure, as on a deep diving submarine, pressure release elements that are comprised of stacked sheets of thin rag paper packaged in thin soft rubber provide better results than more conventional pressure release materials, e.g., cellular rubber in the prior art. The three different sized stacks of paper may be combined in one package. The conducting leads from the piezoelectric ceramic elements $30a$, $32a$, and $34a$ are snaked around and between the various parts to the opening 44 and are connected to the corresponding cable leads; these connections are omitted in the drawings. The volume defined by the inside surface of the side wall of the housing and the distance between the open end of the housing and the planar face of the assembled hydrophones is filled by an acoustically transparent soft, elastomeric, potting material 56 having approximately the same rho-c as water, that is substantially free of pockets of gas and that cures at temperatures below that which would cause depolarization of the piezoelectric material. One suitable material now used extensively in the art for this purpose is relatively cold-curing, soft polyurethane. A neoprene cap 58 is bonded face to face to the surface of the potting material, essentially free of entrapped air pockets therebetween, and also is bonded to the housing. The neoprene cap reinforces the watertight integrity of the acoustic detector. In applications where durability is less important than weight and cost, the housing 40 and neoprene cap 58 may be omitted; the entire assembly may instead be potted in the acoustically transparent soft elastomeric material.

One characteristic of a piezoelectric element in detection is that it has almost constant sensitivity, shown in FIG. 6, along its main axis, from zero to its first or lowest resonant frequency regardless of the mode in which the lowest resonant frequency occurs. Just beyond the resonant frequency, the sensitivity drops 12 db per octave to essentially no response. This characteristic is described in "Fundamentals of Acoustics," by F. A. Fischers, published by Interscience Publishers, Inc. of New York, 1955. At a substantially higher frequency the sensitivity rises to a plateau and continues at the plateau to the next resonance which occurs in another mode and as the frequency is increased further, beyond the latter resonance, the 12 db drop per octave repeats. Each hydrophone may have several responses similar to the two shown in FIG. 6. Because of the sharp drop in sensitivity just beyond each resonance, the dimensions of the hydrophones shall be selected so that there is no resonance intermediate the ends of the band assigned to a hydrophone.

It is advantageous to design each hydrophone so that its first resonance is at the upper end of the band assigned to that hydrophone. The beamwidth of each hydrophone narrows with increasing frequency as shown in FIG. 7. If the hydrophone were to continue to contribute to the output at frequencies where its beamwidth were too sharply focused it would in almost all causes be contributing noise only to the output since it would not respond to a signal at the higher frequency arriving from a direction outside its sensing beam, which is narrow with respect to acoustic energy at that higher frequency.

Another consideration governing the design of the hydrophones is the choice of beamwidth limits. The beamwidth is obtained from the polar plot of sensitivity as a function of angle relative to the main axis and is equal to the angle between the half-power points on each side of the main response axis. Satisfactory results have been obtained in the system described wherein the beamwidth of each hydrophone over the frequency band assigned thereto ranged between 60–100 degrees with best results for the system shown in FIG. 1 at a beamwidth between approximately intermediate these limits. As beamwidth increases, the hydrophone senses from a wider angle and hence, senses more noise. Therefore, as the beamwidth increases, the signal-to-noise ratio decreases, even though the sensitivity of the element may be constant over the frequency band assigned. Also, the bearing discrimination is reduced in the system shown in FIG. 2 with respect to a signal at the low frequency end of its band because the beam approaches arcuate configuration. On the other hand, the beamwidth becomes too narrow at the frequency at which the sensitivity to a signal at that frequency at a bearing of 45 regrees relative to two hydrophones is too low. For a given frequency spectrum for the hydrophone array, the range of beamwidth per hydrophone depends upon the band assigned to each hydrophone. With more hydrophones, the width of the frequency band assigned to each hydrophone is lessened whereby the range of beamwidth is lessened or more nearly constant. This must be balanced against increased complexity, cost, weight of additional electronic components, space requirements and the like. For the purpose described in this case, a hydrophone array having three elements for a total spectrum of about 70 kc. provided reasonably good signal-to-noise ratio and bearing discrimination to about ±10 degrees.

The beamwidth is 60 degrees at the frequency at which the outside diameter is equal to one wavelength in water. For a beamwidth of 60–110 degrees, the limits of the frequency band are in a ratio of approximately three-to-one. For the annular hydrophones, resonance in the circumferential mode occurs at the frequency at which the outside diameter is equal to one wavelength.

The thickness of the piezoelectric ceramic is selected for the desired level of sensitivity. It is desirable but not essential that the sensitivities of the several hydrophones, along the main axis of the hydrophone array, be approximately equal.

The diameter of the largest hydrophone is determined first. If not limited by a specified maximum size, the diameter is made equal to one wavelength in water at a frequency approximately three times that of the low end of the spectrum specified for the hydrophone array. The outside diameter of the next smaller hydrophone is made equal to one wavelength at a frequency approximately nine times that of the low end of the spectrum specified for the hydrophone array. The diameter of the innermost hydrophone is made equal to one wavelength in water at the frequency of the high end of the frequency spectrum for the hydrophone array, above the low frequency end of the spectrum. The total length of the smallest hydrophone is equal to one-half wavelength in the material at the frequency of the upper end of the spectrum of the hydrophone array. The wall thickness of the annular hydrophones is 1/8 inch less than the difference between diameters of adjacent hydrophones to provide spase for the acoustic decoupling material. The lengths of the annular hydrophones are greater than the length of the smallest hydrophone else the inertial mass of the annular hydrophones are inadequate. However, the total lengths of the annular hydrophones are substantially less than one-half their diameters to preclude resonance in the axial mode anywhere near the upper frequency end of their respective bands. For design simplification, the lengths of the annular hydrophones may be made equal. If a more dense metal such as lead is used for the inertial mass, the lengths of the annular hydrophones may be minimized.

"Acoustics," by L. Beranek, published by McGraw-Hill, is a helpful reference in designing a hydrophone in accordance with this invention.

The annular piezoelectric ceramic elements need not be made in one piece; for economy, ease of manufacture and like practical considerations, larger annuli may be fabricated from arcuate wedge-like sectors bonded together to form a ring with the corresponding conductive films connected in common. To increase capacitance, where the axial length of piezoelectric ceramic needed for adequate sensitivity is too low for proper impedance matching, particularly where the innermost element is concerned, the piezoelectric ceramic is made up of a stack of several substantially identical laminae bonded together face to face each of which is of piezoelectric ceramic coated with a conductive film on both its faces and polarized in the thickness dimension and connected in additive parallel, whereby the sensitivity is essentially the same as for one solid element but the capacitance is substantially greater than that of one solid element.

On the drawings, the hydrophone array includes three hydrophones. This is not a limiting feature. A broader spectrum, better signal-to-noise ratio, a more constant beamwidth over the spectrum, maximum range of sensitivity as a function of bearing over the assigned band, etc., may require more than three hydrophones. A narrower spectrum may require only two hydrophones.

Each of the acoustic detectors 10 in FIG. 1 includes a hydrophone array 16, amplifiers 60, 62, 64 coupled to the respective hydrophones 30, 32, 34, each having approximately the same gain and substantially flat response over at least the frequency band of the respective hydrophone. Bandpass filters 66, 68, 70 for the bands of the respective hydrophones are either included in the amplifier design or are connected to the outputs of the respective hydrophones. Decoupling diodes are connected to the outputs of the bandpass filters. The signal is RC coupled to the respective deflection plate. Preamplifiers are included in the system if necessary.

It will be understood that various changes in the details, materials and arrangements of parts and steps, which have been herein described and illustrated in order to explain the nature of the invention, may be made by those skilled in the art within the principle and scope of the invention as expressed in the appended claims.

I claim:
1. A wide-angle broadband hydrophone array comprising:
   a plurality of coaxial cylindrical hydrophones, each hydrophone terminating in opposed flat ends normal to the axis,
   soft elastomeric material spacing adjacent hydrophones from each other,
   one end of each of said hydrophones being substantially coplanar,
   a base for said hydrophones, pressure release material spacing the base and the other ends of the hydrophones, and
   means securing together and waterproofing said hydrophones, pressure release material and base, and operative to acoustically couple the coplanar ends of the hydrophones to seawater in which the hydrophone array is immersed.

2. A wide angle broad band hydrophone array as defined in claim 1 wherein each of said hydrophones includes an inertial mass as part of its length extending from intermediate its end to its other end and bearing against said pressure release material.

3. A wide angle broad band hydrophone array as defined in claim 2, wherein the hydrophones are circular cylinders, the innermost element being a solid cylinder.

4. A wide angle broad band hydrophone array as defined in claim 3, wherein said pressure release material is paper in laminar form normal to the axis of the hydrophones.

References Cited by the Examiner

UNITED STATES PATENTS

| | | | |
|---|---|---|---|
| 2,153,571 | 4/1939 | Kallmeyer | 340—11 |
| 2,432,625 | 12/1947 | Klein | 340—6 |
| 2,733,423 | 1/1956 | Camp | 340—10 |
| 2,746,026 | 5/1956 | Camp | 340—8 |
| 2,748,369 | 5/1956 | Smyth | 340—10 |
| 2,776,416 | 1/1957 | Harris | 340—11 |
| 2,787,736 | 4/1957 | Ellison et al. | 340—16 X |
| 2,867,788 | 1/1959 | Harry | 340—6 |
| 2,962,697 | 11/1960 | Rockwell | 340—16 |
| 3,050,707 | 4/1962 | Baker et al. | 340—6 |
| 3,172,078 | 3/1965 | Mazzagatti | 340—10 X |

CHESTER L. JUSTUS, *Primary Examiner.*

R. A. FARLEY, *Assistant Examiner.*